United States Patent
Sexton

(10) Patent No.: US 9,983,850 B2
(45) Date of Patent: May 29, 2018

(54) SHARED HARDWARE INTEGER/FLOATING POINT DIVIDER AND SQUARE ROOT LOGIC UNIT AND ASSOCIATED METHODS

(71) Applicant: Samsung Electronics Co., Ltd., Suwon-si, Gyeonggi-do (KR)

(72) Inventor: Bonnie Sexton, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 182 days.

(21) Appl. No.: 14/996,216

(22) Filed: Jan. 14, 2016

(65) Prior Publication Data

US 2017/0017467 A1 Jan. 19, 2017

Related U.S. Application Data

(60) Provisional application No. 62/191,993, filed on Jul. 13, 2015.

(51) Int. Cl.
*G06F 7/48* (2006.01)
*G06F 7/487* (2006.01)
*G06F 7/552* (2006.01)

(52) U.S. Cl.
CPC .......... *G06F 7/4873* (2013.01); *G06F 7/5525* (2013.01)

(58) Field of Classification Search
CPC .. G06F 2207/3824; G06F 7/4873; G06F 7/52; G06F 7/535; G06F 7/5525; G06F 2007/5352
USPC ........................................ 708/495, 504, 650
See application file for complete search history.

(56) References Cited

U.S. PATENT DOCUMENTS

| | | | | |
|---|---|---|---|---|
| 4,878,190 A | * | 10/1989 | Darley | G06F 7/4824 708/605 |
| 4,939,686 A | * | 7/1990 | Fandrianto | G06F 7/4824 708/605 |
| 5,128,891 A | | 7/1992 | Lynch et al. | |
| 5,272,660 A | * | 12/1993 | Rossbach | G06F 7/535 708/504 |
| 5,309,383 A | * | 5/1994 | Kuroiwa | G06F 7/535 708/496 |
| 6,487,575 B1 | | 11/2002 | Oberman | |
| 6,847,985 B1 | | 1/2005 | Gupta et al. | |
| 2004/0083255 A1 | * | 4/2004 | Hinds | G06F 7/5375 708/650 |

(Continued)

*Primary Examiner* — Michael D. Yaary
(74) *Attorney, Agent, or Firm* — Renaissance IP Law Group LLP

(57) ABSTRACT

Embodiments of the inventive concept include a shared hardware integer/floating point divider and square root logic unit, which combines floating point division, floating point square root operations, and/or integer division into one shared hardware design. The shared hardware logic unit can share, for example, a sparse random access memory (sparse RAM) in place of a full partial remainder divisor (PD) table, one or more on-the-fly (OTF) state machines, and/or a data path for integer division, floating point division, and square root operations. The normalization of subnormal numbers and the normalization of signed and unsigned integers can be handled with shared hardware. The division operations and the square root operations can be of the same radix. Early out exceptions and special cases can be automatically handled. Both improved latency and less die area can be achieved in accordance with embodiments of the inventive concept.

18 Claims, 9 Drawing Sheets

(56) References Cited

U.S. PATENT DOCUMENTS

2006/0129625 A1* 6/2006 Olson .................. G06F 7/4873
                                                    708/650
2016/0313976 A1* 10/2016 Dibrino .................... G06F 7/52

* cited by examiner

SHARED HARDWARE INTEGER/FLOATING POINT DIVIDER AND SQUARE ROOT LOGIC UNIT AND ASSOCIATED METHODS

RELATED APPLICATION DATA

This application claims the benefit of U.S. Patent Application Ser. No. 62/191,993, filed Jul. 13, 2015, which is hereby incorporated by reference.

BACKGROUND

The present inventive concepts relate to cell designs in circuits, and more particularly, cell swapping techniques, devices, and systems based on a ceiling determination, a floor determination, and cell attribute weighting criteria.

Conventional integer division hardware must make a tradeoff between less area and better latency. It is difficult or impossible to achieve both low die area usage and low latency using convention techniques. Floating point capability and related hardware are conventionally separate from the integer division hardware, which has the effect of increasing the die area. Embodiments of the present inventive concept address these and other limitations in the prior art.

BRIEF SUMMARY

Embodiments of the inventive concept can include a computer-implemented method for processing floating point division, integer division, and square root operations using a shared hardware logic unit. The method can include receiving, by the shared hardware logic unit, a first divisor source input and a first dividend source input. The method can include performing, by the shared hardware logic unit, a floating point divide operation using the first divisor source input and the first dividend source input. The method can include outputting, by the shared hardware logic unit, a quotient result of the floating point divide operation. The method can include receiving, by the shared hardware logic unit, a second divisor source input and a second dividend source input. The method can include performing, by the shared hardware logic unit, an integer divide operation using the second divisor source input and the second dividend source input. The method can include outputting, by the shared hardware logic unit, a quotient result of the integer divide operation.

Embodiments of the inventive concept can include a shared hardware logic unit. The shared hardware logic unit can include a plurality of shared logic sections configured to perform a floating point divide operation, an integer divide operation, and a square root operation. The shared hardware logic unit can include a first stage logic section from among the plurality of shared logic sections configured to receive a first divisor source input and a first dividend source input associated with the floating point divide operation, and to receive a second divisor source input and a second dividend source input associated with the integer divide operation. The shared hardware logic unit can include a last stage logic section from among the plurality of shared logic sections configured to output a quotient result of the floating point divide operation and a quotient result of the integer divide operation.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
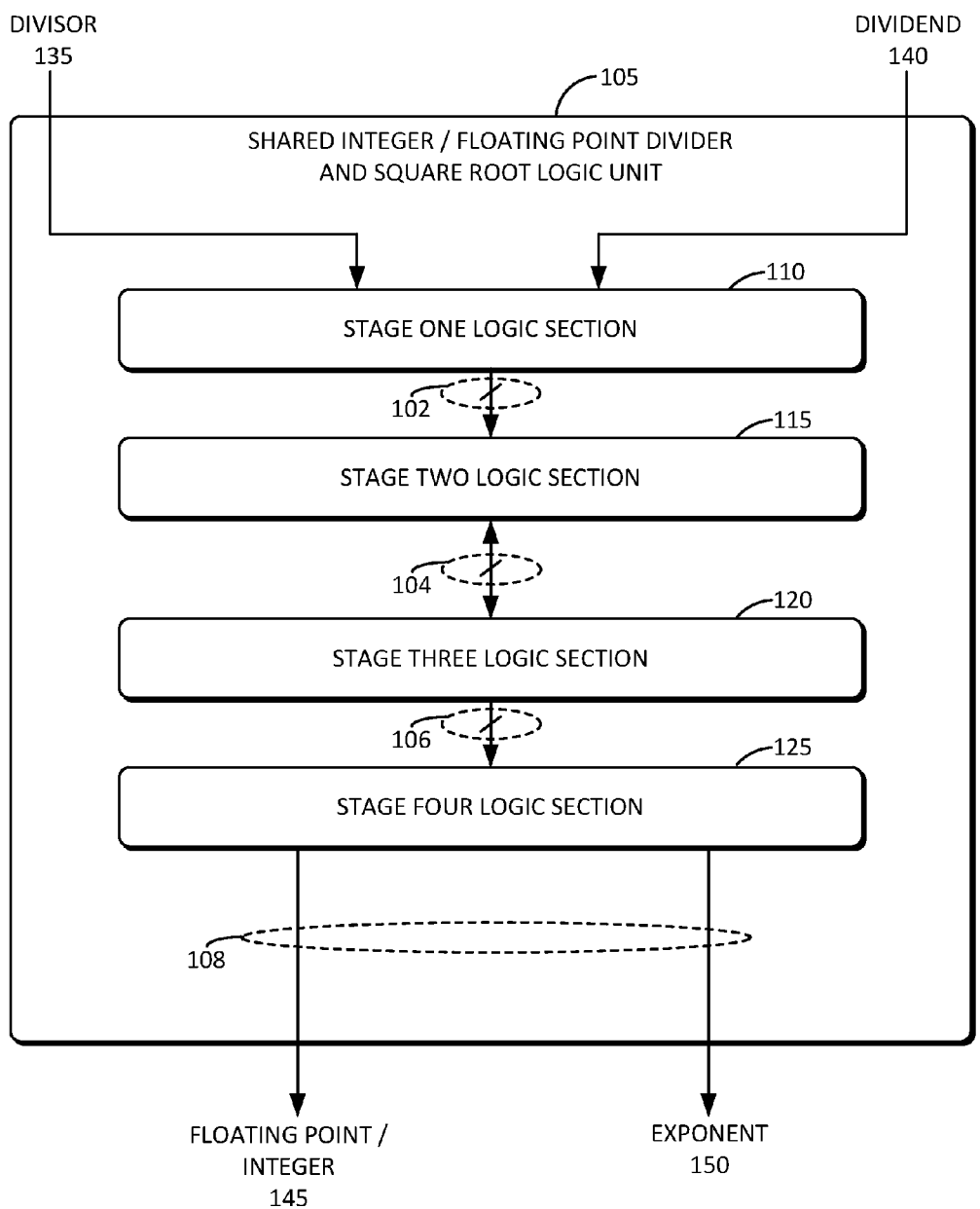
FIG. 1 is an example block diagram of a shared hardware integer/floating point divider and square root logic unit in accordance with embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first logic stage could be termed a second logic stage, and, similarly, a second logic stage could be termed a first logic stage, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include a shared hardware integer/floating point divider and square root logic unit, which combines floating point division, floating point square root operations, and/or integer division into one shared hardware design. Microprocessors and other logic components can incorporate the shared logic unit to improve functional unit utilization, reduce power consumption, and/or reduce area by at least 50%. The shared hardware integer/floating point divider and square root logic unit can share, for example, a sparse random access memory (sparse RAM) in place of a full partial remainder divisor (PD) table, one or more on-the-fly (OTF) state machines, and/or a data path for integer division, floating point division, and square root operations. The normalization of subnormal numbers and the normalization of signed and unsigned integers can be handled with shared hardware. The division operations and the square root operations can be of the same radix. For example, a particular radix (e.g., 4, 8, 16, etc.) can be consistently used for both division and square root operations, and all higher radices can be used throughout the design. Early out exceptions and special cases can be automatically handled. Both improved latency and less die area can be achieved in accordance with embodiments of the inventive concept.

Division operations involve a divisor, a dividend, one or more partial remainders, and so forth. Different combinations of the divisor, dividend, partial remainder, and the like, can be normalized, zero skipped, prescaled, and/or post-scaled. Division operations can involve integer division, floating point division, or both, as further described in detail below.

An integer is a signed number, which can be negative or non-negative, and that does not have a fractional component. A floating point number, on the other hand, is a representation or approximation of a real number, which can have a fractional component. A real number can be represented by a fixed number of significant digits (i.e., the "significand" or "mantisa," but generally referred to herein as the "significand") and scaled using an exponent. The representation also includes a sign (i.e., negative or non-negative) and a base or radix (generally referred to herein as the "radix"), which is normally two, but can also be four, eight, ten, sixteen, or the like. A decimal point within the real number is referred to herein as a radix point. The radix point can be placed at any location between any two digits of the significand, although it is usually placed just before or just after the first (i.e., most significant) digit in the significand. For example, the real number 3.52641 can be represented by $352641 \times 10^{-5}$, where "352641" is the significand, 10 is the radix, and −5 is the signed exponent. Although this represents a radix ten example, as mentioned above, the radix can be two, four, eight, sixteen, and so forth. For example, a radix two floating point number can be represented as $\{(sign) \times (1+significand) \times 2^{(exponent-bias)}\}$.

The significand (including its sign) and the exponent (including its sign) can be stored in a variety of ways depending on the particular computer implementation. Generally, a single precision floating point number occupies 32 bits (i.e., 4 bytes) and its significand usually occupies or otherwise has a precision of 24 of those bits, whereas a double precision floating point number usually occupies 64 bits (i.e., 8 bytes) and its significand usually occupies or otherwise has a precision of 53 of those bits. Put differently, the single and double precision floating point formats can be normalized 24 and 53 bits, respectively. For both floating point and integer, the significand can include a normalized quantity with an express or implied leading bit to the left of the implied binary or radix point, followed by the magnitude. It will be understood that other larger or smaller floating point numbers with different precision can be used without departing from the inventive concept disclosed herein.

Embodiments of the inventive concept include techniques for normalization and iteration prediction for division operations. The techniques can include using a radix and a count leading zero (CLZ) operation with a post adjustment to derive CLZ radix counts. A distance between the CLZ radix counts can be determined using a rounding operation such as: round[(CLZ radix divisor−CLZ radix dividend)]=CLZ radix distance. Source values including a divisor and a dividend can be received for processing. Shifting by the CLZ amount yields normalized source values. A post adjustment can be applied to the normalized source values. The CLZ radix distance can be used for each of a number of iterations within the division operation. This approach works for both integer and floating point division operations. Square root iterations can be determined by precision. The shifting information can be saved and used at a later time.

Floating point and integer normalization and iteration calculations can be handled using the same shared hardware logic unit. Integer signed versus unsigned information is rendered irrelevant, which makes the integer operation similar to floating point significand operations. Embodiments of the inventive concept provide for straight forward scaling as the radix scales up. An exact number of iterations can be known for division operations. Square root maximum iterations can be the precision limitations. Knowing the exact number of iterations can allow for precise doorbells and better latency of operations.

Adjustments can be made of each source value before the iterations are performed for each type of source value. For example, an integer dividend with a radix of 4 can be 000.{2 s compliment dividend}. A floating point dividend with a radix of 4 can be 0001.dividend, with the "0001" portion prepended. A floating point radicand with a radix of 4 can be 001000.radicand (EVEN) and/or 000100.radicand (ODD). It will be understood that these are examples and other suitable adjustments can be made. Once adjustments for the binary point have been made, differences have been minimized, and the significand can be processed in the same manner for all subsequent operations, including floating point and integer operations. Initial padding of the source values can be applied, which can be handled by muxing. Traditional exponent calculations can be performed in parallel when needed and do not change the latency. Rounding and exponent calculations need only be done for floating point operations, which are not applicable to integer operations.

As mentioned above, early out exceptions and special cases can be automatically handled. The early out exceptions and special cases can be categorized as type I early outs and type II early outs. Type I and/or II early outs can be checked at or near the beginning of the technique, and can be used to stop the iterations from proceeding. Type I early outs can be determined by examining the source values. Some special cases and exceptions can be shared by both integer and floating point operations. For example, type I early outs can include situations where (i) a divisor is equal to 1, −1, or 0, (ii) a dividend is equal to the divisor, (iii) a CLZ radix (dividend) is equal to a CLZ radix (divisor), (iv) floating point exceptions such as divide by zero, and/or (v) floating point special cases such as power of 2, or the like. Type II early outs can include situations such as a zero remainder, which can cause the iterations to be stopped. Type II early outs can be applied to both integer and floating point operations.

Both integer and floating point operations can be implemented using the same sparse random access memory (sparse RAM), which can function in a manner similar to a partial remainder divisor (PD) table, but can be more compact and efficient than using a full PD table with respect to rows and a personality key, as further described below. One or more on-the-fly (OTF) state machines can also be shared for both integer and floating point operations. A full adder can be shared for both integer and floating point operations, and can be segmented for two 32-bit sources. Two's complement and rounding operations can be performed in the same full adder. One shifter can be shared across the full data path width. Multiples can be determined in the same manner for all operations and can use the same hardware. Normalization can be performed for all operations and small adjustments can be made, while scaling up is possible due to the CLZ radix approach described herein, and further described in detail below.

One or more results can be adjusted in one or more post-adjustment operations. A quotient can be normalized for both integer and floating point operations using the saved original shifting information mentioned above. An original CLZ amount can be used to determine the number of shifts. CLZ radix amounts and a CLZ radix difference can scale up as the radix goes up. A difference in shifts between the dividend and the divisor can be used to adjust the maximum iterations for integer division. Exponent calculations can continue in the traditional way. Special case "architected" or default results can be muxed in a last stage using shared logic, as further described below. For example, if an integer is divided by 1, the result can be already known and muxed in at the last stage.

FIG. 1 is an example block diagram of a shared hardware integer/floating point divider and square root logic unit 105 in accordance with embodiments of the inventive concept. The shared hardware logic unit 105 can include a stage one logic section 110, a stage two logic section 115, a stage three logic section 120, and/or a stage four logic section 125, which are described in detail below. The shared hardware logic unit 105 can receive a divisor 135 and a dividend 140 as inputs. The shared hardware logic unit 105 can perform various operations such as integer division operations, floating point division operations, and/or square root operations. Such operations can include one or more iterations that can be applied to source values (e.g., the divisor 135 and/or the dividend 140) to arrive at a final result or solution. For example, in the case of a division operation, the final result can be a quotient, which can have multiple parts such as a floating point/integer portion 145 and an exponent portion 150.

The stage one logic section 110 can receive and process the divisor 135 and the dividend 140. The stage one logic section 110 can generate and output values 102, which can be received by the stage two logic section 115. The stage two logic section 115 can receive and process the values 102. The stage two logic section 115 can generate and output one or more of output signals 104, which can be received and processed by the stage three logic section 120. The stage two logic section 115 can receive one or more of the values 104 from the stage three logic section 120. The stage three logic section 120 can generate and output values 106, which can be received by the stage four logic section 125.

The stage four logic section 125 can receive and process the values 106. The stage four logic section 125 can generate and output solution values 108, such as a quotient result. In the case of an integer division operation, the stage four logic section 125 can output an integer value 145 and/or an exponent 150. In the case of a floating point division operation, the stage four logic section 125 can output a floating point value 145 and/or an exponent 150. In the case of a square root operation, the stage four logic section 125 can output an integer value 145, a floating point value 145, and/or an exponent 150.

Various components of each of the four logic sections (e.g., 110, 115, 120, and 125) can be used and shared for processing integer division operations, floating point division operations, and/or square root operations. It will be understood that while four logic sections are illustrated and described, any suitable number of logic sections can be used without departing from the inventive concept disclosed herein. A detailed description of each of the logic sections and stages is provided below.

Figure 2:
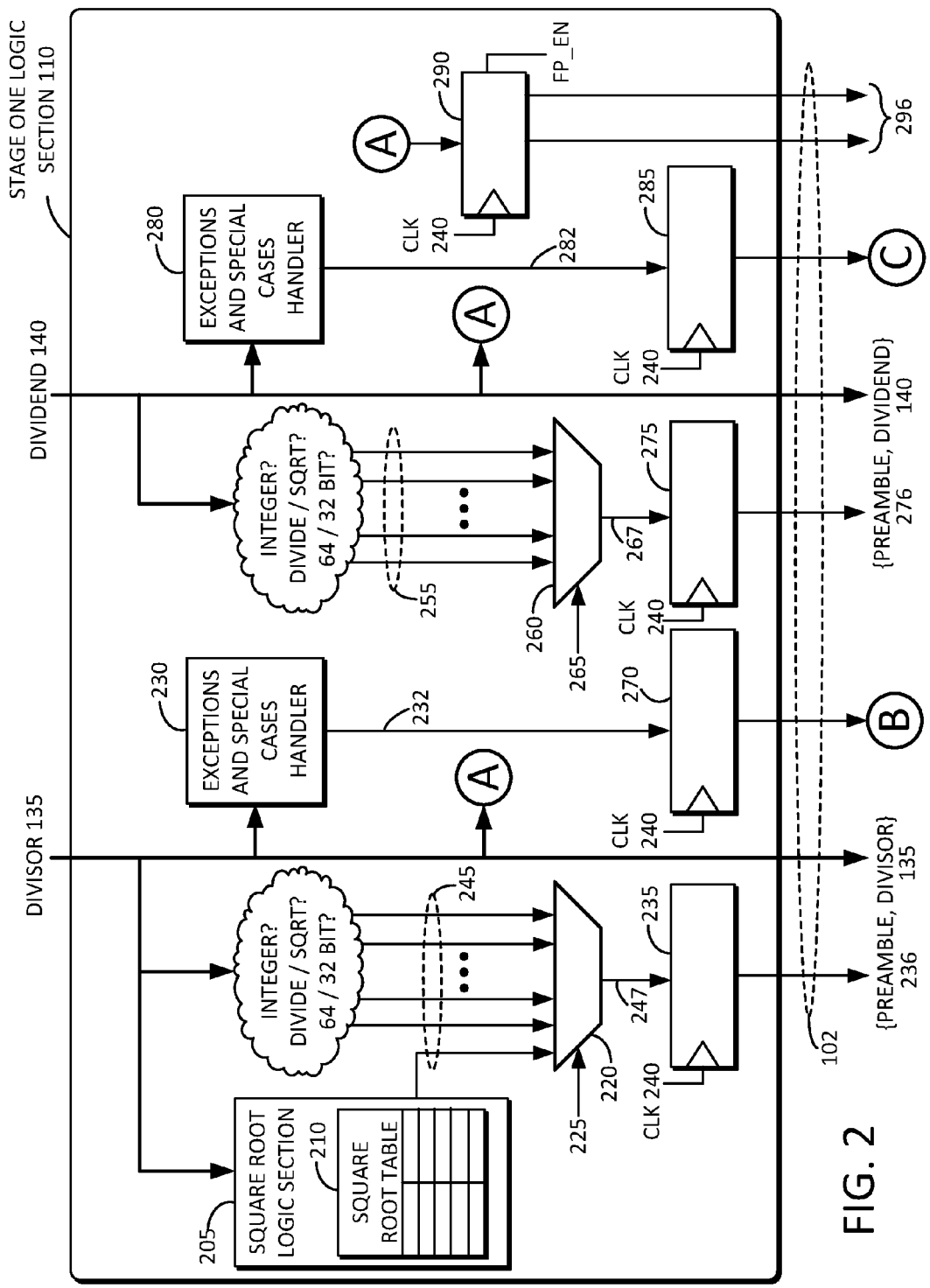
FIG. 2 is an example block diagram of a stage one logic section of the shared hardware integer/floating point divider and square root logic unit of FIG. 1.

FIG. 2 is an example block diagram of a stage one logic section 110 of the shared hardware integer/floating point divider and square root logic unit 105 of FIG. 1. The stage one logic section 110 can receive the divisor 135 and the dividend 140, sometimes referred to herein as source values, and can output signals 102. The stage 1 logic section 110 can include an exceptions and special cases handler 230 for up-front detecting and handling exceptions and special cases related to the divisor 135. Similarly, the stage 1 logic section 110 can include an exceptions and special cases handler 280 for up-front detecting and handling exceptions and special cases related to the dividend 140. The handler 230 can detect and/or save one or more exception and/or special cases 232 related to the divisor 135. The handler 280 can detect and/or save one or more exception and/or special cases 282 related to the dividend 140. One or more flip-flops 270 can temporarily store the one or more exception and/or special cases 232 related to the divisor 135, and output the one or more exception and/or special cases 232 as shown by circle 'B.' The one or more flip-flops 270 can be clocked by clock signal 240. One or more flip-flops 285 can temporarily store the one or more exception and/or special cases 282 related to the dividend 140, and output the one or more exception and/or special cases 282 as shown by circle 'C.' The one or more flip-flops 285 can be clocked by the clock signal 240.

The one or more exception and/or special cases 232 are sometimes referred to herein as type I early outs. The type I early outs 232 can include, for example, a divide by zero early out, a divide by −1 early out, a divide by 3 early out, a subnormal number early out, or the like. An "architected" or default result can be formed or provided instead of an actual quotient value as an output to the shared hardware logic unit 105. The one or more exception and/or special cases 282 are also sometimes referred to herein as type I early outs. The type I early outs 282 can include, for example, a square root of zero early out, a square root of a negative number early out, an infinite number early out, or the like. Similar to the type I early outs 232, an "architected" or default result can be formed or provided for the type I early outs 282 instead of an actual quotient value as an output to the shared hardware logic unit 105.

In the case of a floating point operation, the divisor exponent and/or the dividend exponent, represented by circle 'A,' can be stripped from the divisor and/or the dividend, respectively, and temporarily stored in one or more flip-flops 290. The one or more flip-flops 290 can output the temporarily stored divisor exponent and/or dividend exponent values 296. The one or more flip-flops 290 can be enabled by the FP_EN signal. The one or more flip-flops 290 can be clocked by the clock signal 240.

A selector 220, such as a multiplexor, can select one or more values 247 from among multiple values 245 related to the divisor 135. A control signal 225 can control the selector 220. The values 245 can include an integer related value, a floating point related value, and/or a square root related value. The values 245 can be 64 bit related values or 32 bit related values. The values 245 can be related to a division operation or a square root operation. In the case of a square root operation, a square root logic section 205 can look up a value in a square root table 210, and output the value to the selector 220. A square root estimate can be used to make the operation look like a divide operation using the same radix by providing a starting place for the operation. One or more flip-flops 235 can receive and temporarily store the one or more values 247. The one or more flip-flops 235 can output the one or more values 247 as a preamble 236 to the divisor 135. The preamble 236 can be added as the most significant bits of the divisor 135 as appropriate. The one or more flip-flops 235 can be clocked by the clock signal 240.

A selector 260, such as a multiplexor, can select one or more values 267 from among multiple values 255 related to the dividend 140. A control signal 265 can control the selector 260. The values 255 can include an integer related value, a floating point related value, and/or a square root related value. The values 255 can be 64 bit related values or 32 bit related values. The values 255 can be related to a division operation or a square root operation. One or more flip-flops 275 can receive and temporarily store the one or more values 267. The one or more flip-flops 275 can output the one or more values 267 as a preamble 276 to the dividend 140. The preamble 276 can be added as the most significant bits of the dividend 140 as appropriate. The one or more flip-flops 275 can be clocked by the clock signal 240.

Figure 3:
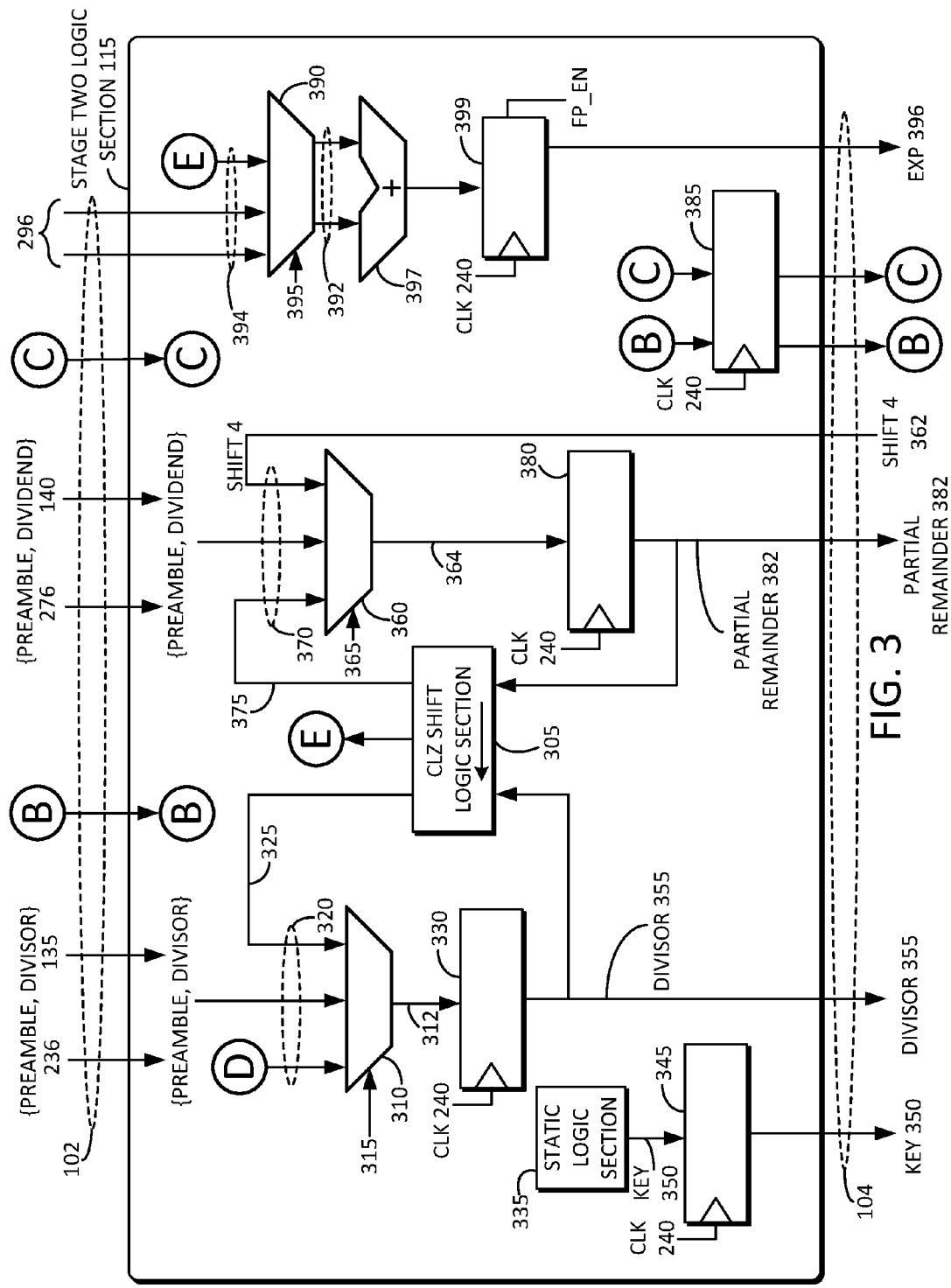
FIG. 3 is an example block diagram of a stage two logic section of the shared hardware integer/floating point divider and square root logic unit of FIG. 1.

FIG. 3 is an example block diagram of a stage two logic section 115 of the shared hardware integer/floating point divider and square root logic unit 105 of FIG. 1. The stage two logic section 115 can receive the signals 102 and can output signals 104. The signals 102 can include the preamble 236 and corresponding divisor 135, the one or more exception and/or special cases as shown by circle 'B,' the preamble 276 and corresponding dividend 140, the one or more exception and/or special cases as shown by circle 'C,' and/or the divisor exponent and/or dividend exponent values 296.

The stage two logic section 115 of the shared hardware logic unit 105 can include a CLZ shift logic section 305. The CLZ shift logic section 305 can be used to normalize the source values. For example, the CLZ shift logic section 305 can normalize all inputs and save a CLZ difference. A selector 310, such as a multiplexor, can select one or more values 312 from among multiple values 320. The multiple values 320 can include the preamble 236 and corresponding divisor 135, a shifted value 325 received from the CLZ shift logic section 305, and/or a QV value indicated by circle 'D.' The shifted value 325 can be the divisor value 355 shifted to the left to normalize and/or to readjust the divisor value 355. The QV value indicated by circle 'D' can be a positive Q vector. The positive Q vector can be, for example, one unit in last place (ULP) different from a quotient vector minus one (i.e., Q−1 or QVM). A control signal 315 can control the selector 310. One or more flip-flops 330 can receive and temporarily store the one or more values 312. The one or more flip-flops 330 can output the one or more values 312 as a divisor 355. The one or more flip-flops 330 can be clocked by the clock signal 240.

In addition, a selector 360, such as a multiplexor, can select one or more values 364 from among multiple values 370. The multiple values 370 can include the preamble 276 and corresponding dividend 140, a shifted value 375 received from the CLZ shift logic section 305, and/or a shifted value 362 received from the stage three logic section 120, as further described below. The shifted value 375 can be the partial remainder value 382 shifted to the left to normalize and/or to readjust the partial remainder value 382. The shifted value 362 can be shifted to the left by four (4), for example. It will be understood that the shifted value 362 can be shifted by any suitable amount. A control signal 365 can control the selector 360. One or more flip-flops 380 can receive and temporarily store the one or more values 364. The one or more flip-flops 380 can output the one or more values 364 as a partial remainder 382. The one or more flip-flops 380 can be clocked by the clock signal 240. The CLZ shift logic section 305 can receive the divisor 355 and the partial remainder 382. The same flip-flops (e.g., 330 and 380) that hold the one or more divisor-related values 312 and the one or more dividend-related values 364, respectively, can be used for the CLZ distance normalizations, thereby saving die area.

The CLZ shift logic section 305 can determine a CLZ distance as shown by circle 'E.' The CLZ distance can be used to adjust the exponent in a floating point operation. The CLZ distance can also be used to determine how many bits to normalize. In addition, the CLZ distance can be used in integer division to determine how many cycles to iterate. A selector 390, such as multiplexor, can receive multiple values 394 including the CLZ distance as indicated by circle 'E,' along with the divisor exponent and/or dividend exponent values 296. A control signal 395 can select one or more values 392 from among the multiple values 394 from among the multiple values 394. An adder 397 can add the one or more selected values 392. One or more flip-flops 399 can receive and temporarily store the added value, which can be output as exponent value 396. The one or more flip-flops 399 can be enabled by the FP_EN signal. The one or more flip-flops 399 can be clocked by the clock signal 240.

One or more flip-flops 385 can receive and temporarily store the one or more exception and/or special cases shown by circle 'B' and/or the one or more exception and/or special cases shown by circle 'C.' The one or more flip-flops 385 can be clocked by the clock signal 240.

The stage two logic section 115 can include a static logic section 335, which can generate one or more personality keys 350. Each of the personality keys 350 can be a multi-bit key, such as a 16 bit, 24 bit, or 28 bit key. Each of the personality keys 350 can be a static value that has been previously synthesized from a PD table with respect to columns. In other words, once initialized or created, the personality keys 350 can remain static without further need of calculating the personality keys 350, thereby eliminating the need for a large PD table lookup scheme. One or more flip-flops 345 can receive and temporarily store the one or more personality keys 350. The one or more flip-flops 345 can be clocked by the clock signal 240.

Figure 4:
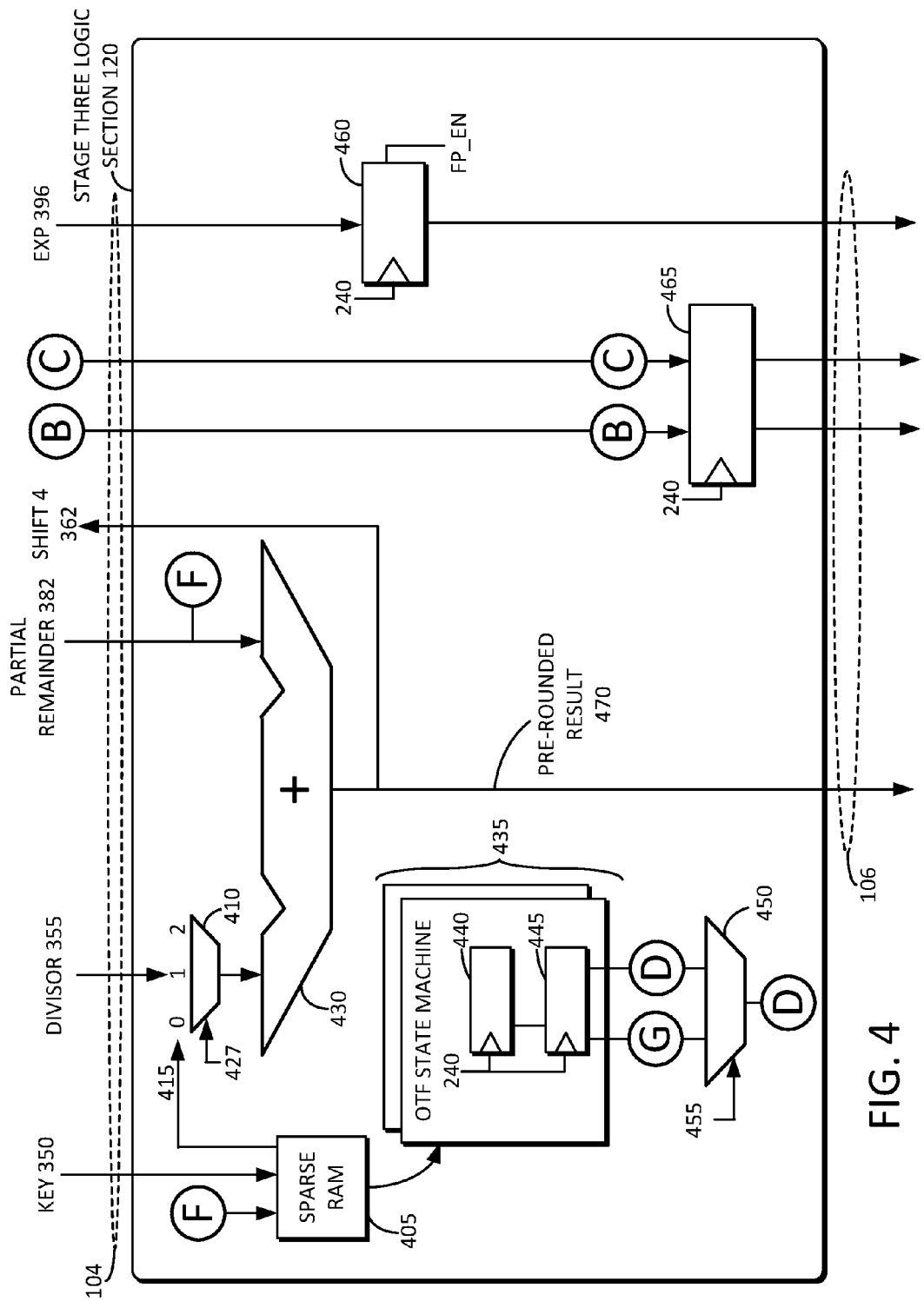
FIG. 4 is an example block diagram of a stage three logic section of the shared hardware integer/floating point divider and square root logic unit of FIG. 1.

FIG. 4 is an example block diagram of a stage three logic section 120 of the shared hardware integer/floating point divider and square root logic unit 105 of FIG. 1. The stage three logic section 120 can receive the partial remainder 382 as indicated by circle 'F.' The partial remainder can include a left over amount after each iteration from subtracting (divisor*multiple) from the dividend. This can also be referred to as a partial residual. The most significant bits of the partial remainder can be used to index into a sparse RAM

405. An estimate referred to as a Qbit can be determined based on a corresponding personality key 350 and/or a value indexed from the sparse RAM 405. The Qbit can track the quotient and/or root at each iteration. One or more Qbits can be generated for each iteration.

The sparse RAM 405 can receive the partial remainder as indicated by 'F' and/or receive the most significant bits of the partial remainder, as mentioned above. The sparse RAM 405 can also receive and/or store the one or more personality keys 350. Each personality key can represent all PD values for a single column. The sparse RAM 405 can produce one or more Qbits 415 (e.g., as represented by 0, 1, 2) to a selector 410, which can be a multiplexor. The selector 410 can also receive the divisor 355 and select among the Qbits 415 and the divisor 355. A control signal 427 can control the selector 410. An adder 430 can sum the output value of the selector 410 and the partial remainder 382 as indicated by circle 'F.' The adder 430 can produce a pre-rounded result 470. The adder 430 can also produce the shifted value 362 as referred to above with reference to FIG. 3.

One or more on-the-fly (OTF) state machines 435 can receive a Qbit from the sparse RAM 405 that is associated with each iteration of an operation. In an SRT division implementation, for example, a minimally redundant form of the Qbit can be used to estimate the actual Qbit, which can be converted back into binary at the end of each iteration. The one or more OTF state machines 435 can take each Qbit per iteration and append it from left to right to each of two vectors, which can be referred to as Q (positive) and Q−1 (minus). Q−1 (minus) can be referred to as a quotient vector minus one (QVM). Q (positive) can be referred to as QV. The two vectors QV and QVM can be maintained one unit in last place (ULP) apart.

The one or more OTF state machines 435 can include one or more flip-flops (e.g., 440 and 445), which can be clocked by the clock signal 240. The one or more flip-flops (e.g., 440 and 445) can temporarily store the two vectors QV and QVM. The one or more OTF state machines 435 can output the two vectors QV as indicated by circle 'D' and QVM as indicated by circle 'G.' A selector 450, such as a multiplexor, can receive the QV and QVM vectors. A control signal 455 can control the selector 450. The selector 450 can select and output either the QV or the QVM vectors.

One or more flip-flops 465 can receive and temporarily store the one or more exception and/or special cases shown by circle 'B' and/or the one or more exception and/or special cases shown by circle 'C.' The one or more flip-flops 465 can be clocked by the clock signal 240. One or more flip-flops 460 can receive and temporarily store the exponent value 396. The one or more flip-flops 460 can be enabled by the FP_EN signal. The one or more flip-flops 460 can be clocked by the clock signal 240.

Figure 5:
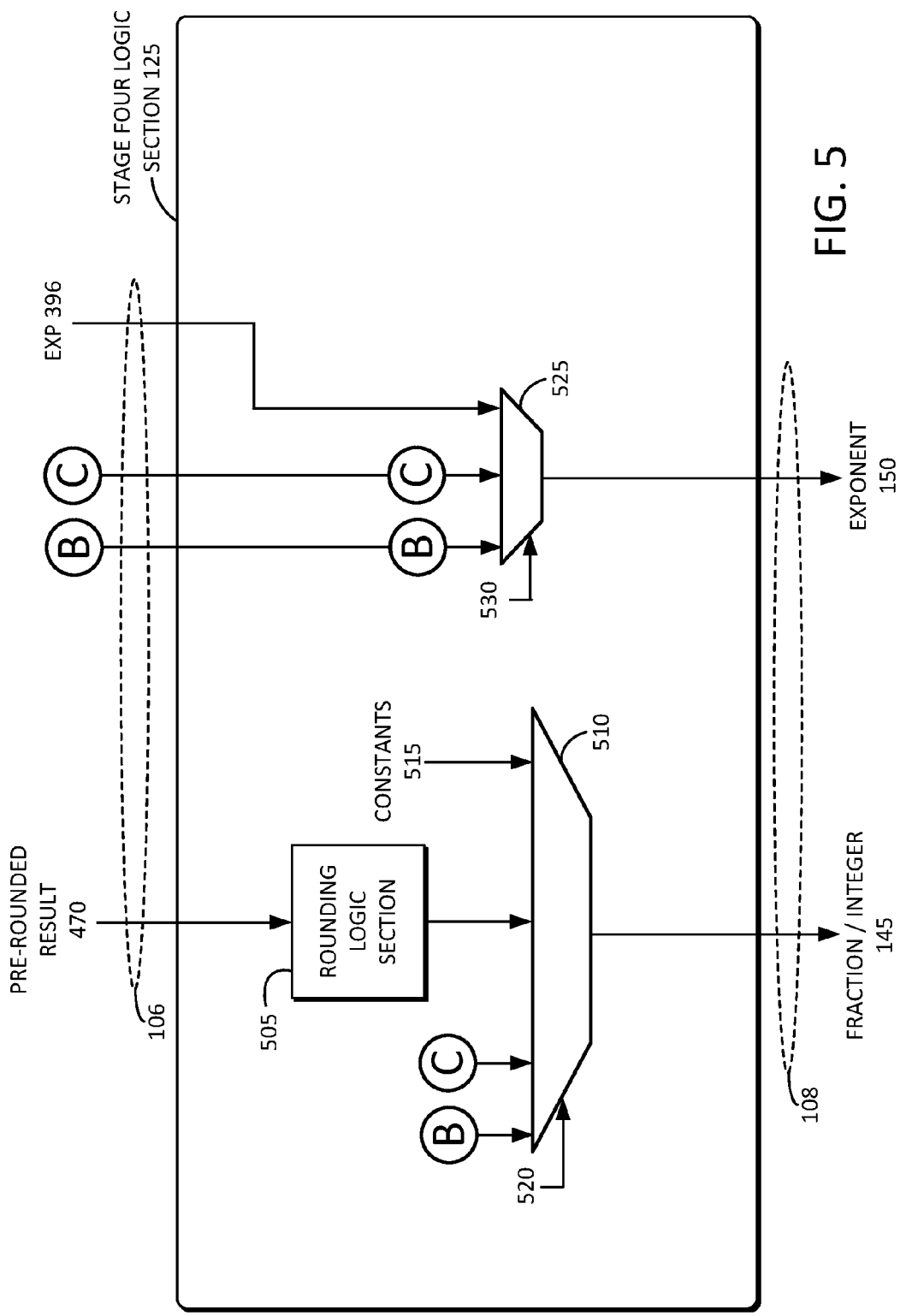
FIG. 5 is an example block diagram of a stage four logic section of the shared hardware integer/floating point divider and square root logic unit of FIG. 1.

FIG. 5 is an example block diagram of a stage four logic section 125 of the shared hardware integer/floating point divider and square root logic unit 105 of FIG. 1. The stage four logic section 125 can include a rounding logic section 505. If the operation is a floating point division operation, then the rounding logic section 505 can round the quotient. In the floating point case, if the final quotient is subnormal (i.e., an extra most-significant-bit of zero can be produced), then the rounding logic section 505 can shift adjust the quotient. A selector 510, such as a multiplexor, can receive the rounded or adjusted value from the rounding logic section 505. The selector 510 can also receive the one or more exception and/or special cases as shown by circle 'B' and/or the one or more exception and/or special cases as shown by circle 'C.' The selector 510 can also receive constants 515. The constants 515 can include the special cases and exceptions described above. A control signal 520 can control the selector 510, and cause the selector 510 to select from among the rounded or adjusted value received from the rounding logic section 505, the constants 515, the one or more exception and/or special cases as shown by circle 'B,' and/or the one or more exception and/or special cases as shown by circle 'C.' The selector 510 can output the floating point and/or integer value 145, or a default solution in the event of an exception or special case.

The stage four logic section 125 can include a selector 525, which can be a multiplexor. The selector 525 can receive the exponent value 396. The selector 525 can also receive the one or more exception and/or special cases as shown by circle 'B' and/or the one or more exception and/or special cases as shown by circle 'C.' A control signal 530 can control the selector 525, and cause the selector 525 to select from among the exponent value 396, the one or more exception and/or special cases as shown by circle 'B,' and/or the one or more exception and/or special cases as shown by circle 'C.' The selector 525 can output the exponent 150.

Figure 6A:
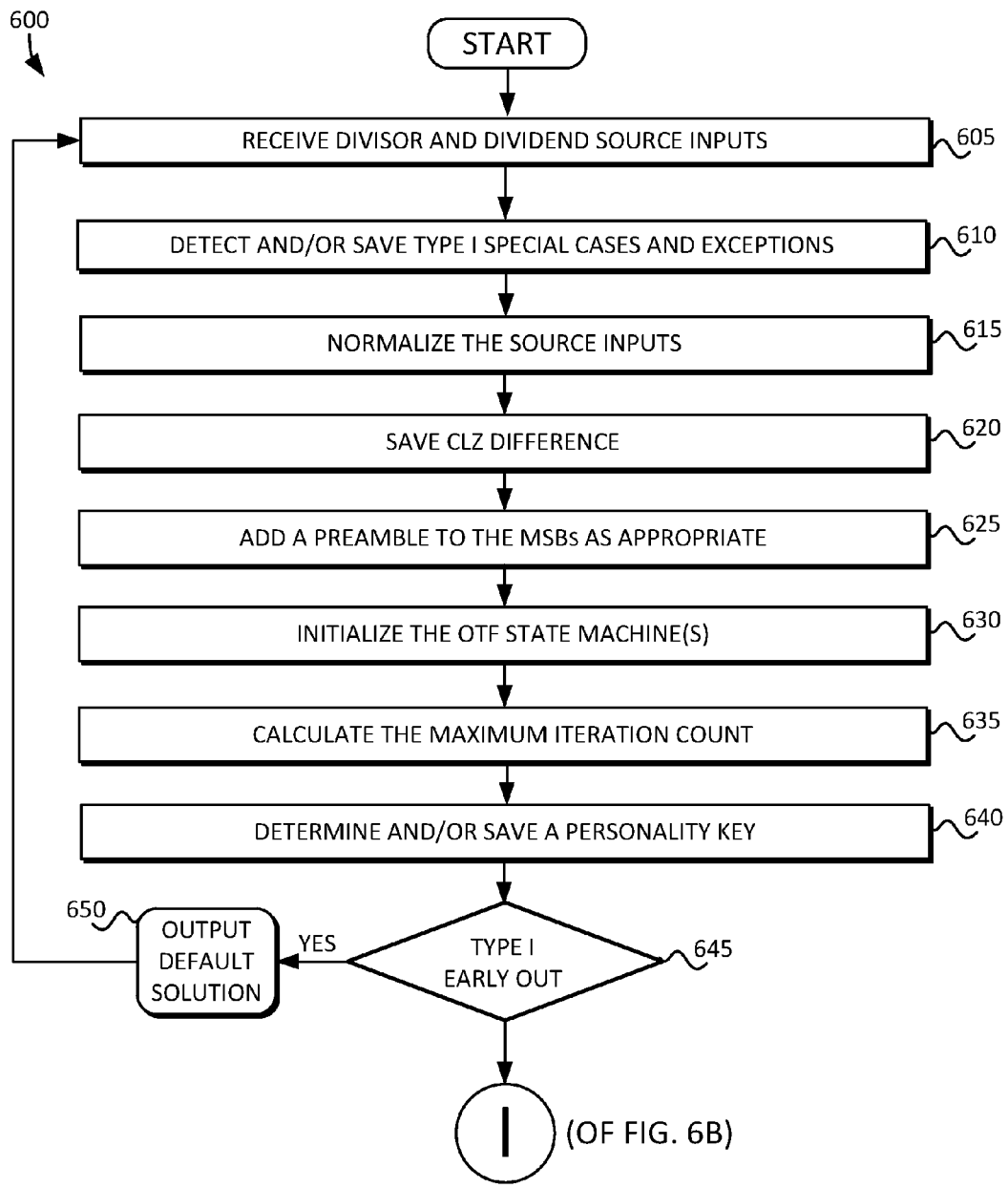
FIGS. 6A, 6B, and 6C show a flow diagram illustrating a technique for sharing integer operations, floating point operations, and square root operations within a shared hardware integer/floating point divider and square root logic unit in accordance with embodiments of the inventive concept.
Figure 6B:
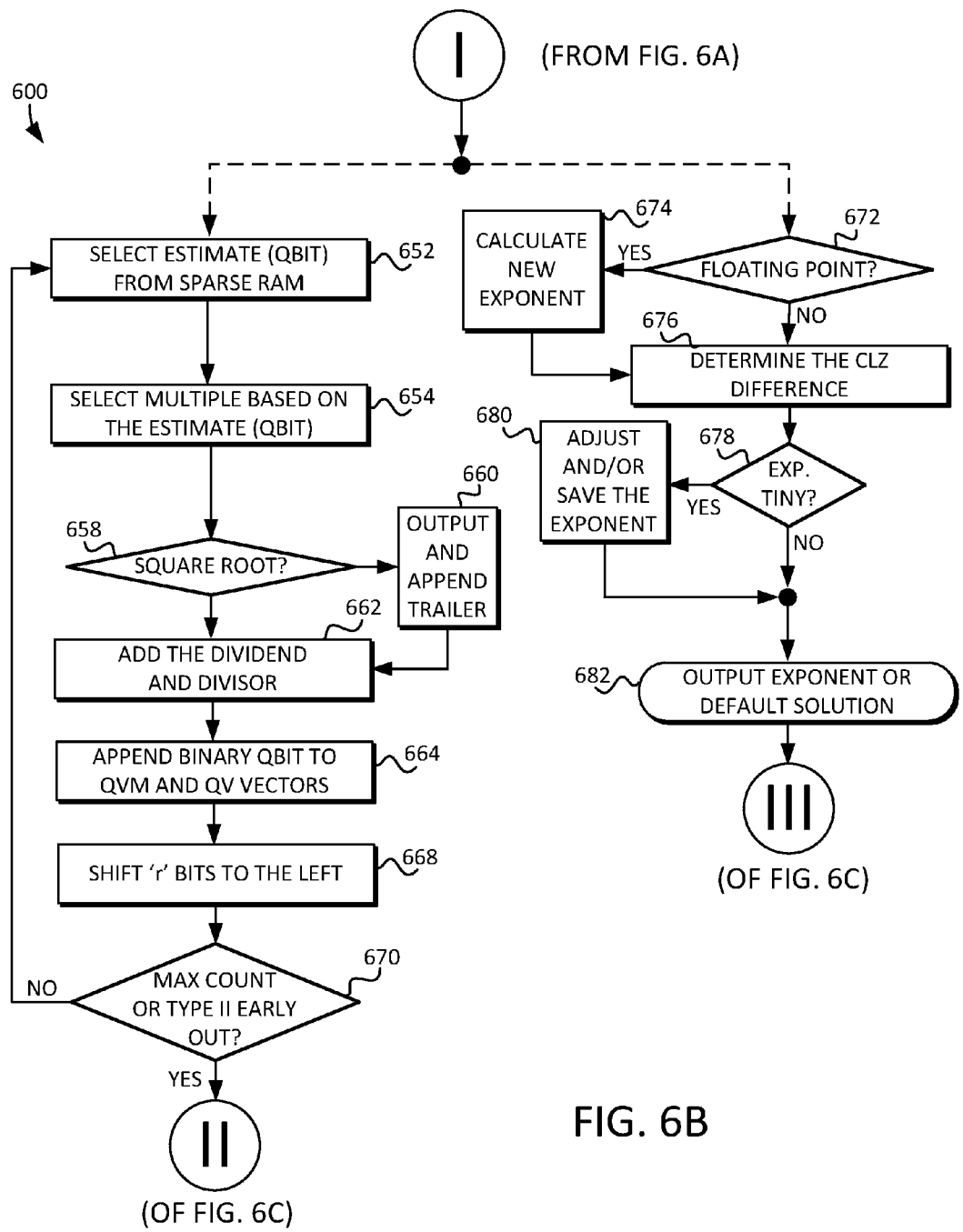
Figure 6C:
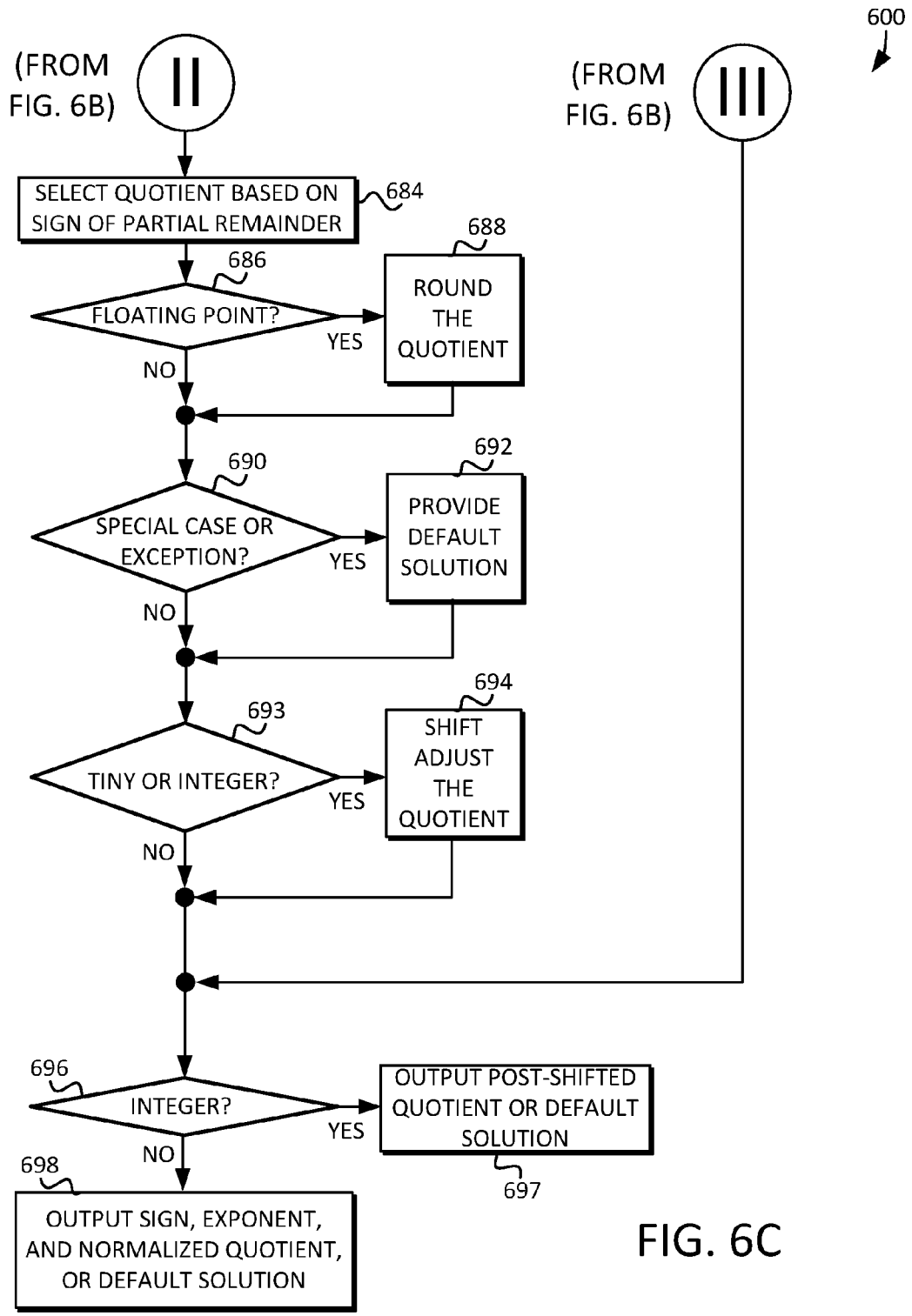

FIGS. 6A, 6B and 6C show a flow diagram 600 illustrating a technique for sharing integer operations, floating point operations, and square root operations within a shared hardware integer/floating point divider and square root logic unit (e.g., 105) in accordance with embodiments of the inventive concept. The technique can begin at 605, where a divisor source input and dividend source input can be received by a shared hardware logic unit (e.g., 105). At 610, the share hardware logic unit 105 can detect and/or save type I special cases and/or exceptions, as described in detail above. At 615, the divisor and/or dividend source inputs can be normalized. At 620, a CLZ difference can be saved, for example, by the CLZ shift logic section 305 (of FIG. 3). At 625, a preamble can be added to the most significant bits of the divisor and/or the dividend as appropriate. At 630, the one or more OTF state machines (e.g., 435 of FIG. 4) can be initialized. At 635, a maximum iteration count for a particular operation can be calculated in advance of performing the particular operation. At 640, one or more personality keys (e.g., 350 of FIG. 3) can be determined and/or saved.

A determination can be made at 645 whether a type I early out exists. If YES, the flow can proceed to 650 where a default solution can be output as the result, and the flow can return to 605 to receive and process additional source inputs. Otherwise if NO, meaning that there are no type I early outs, then the flow can proceed to FIG. 6B through circle 'I.' As shown in FIG. 6B, the flow can split along two parallel paths. The tasks performed in one path can be done in parallel to tasks performed in the other path. At 652, an estimate (e.g., Qbit) can be selected from a sparse RAM (e.g., 405 of FIG. 4). At 654, a multiple can be selected based on the Qbit.

At 658, a determination can be made whether the current operation is a square root operation. If YES, the flow can proceed to 660 where a trailer can be output, for example, by the one or more OTF state machines (e.g., 435 of FIG. 4), and appended to a square root multiple after the Qbit is known. Otherwise if NO, meaning that the current operation is not a square root operation, the flow can proceed to 662, where the dividend and the divisor can be added together. At 664, a binary Qbit can be appended to QVM and QV vectors. At 668, 'r' bits can be shifted to the left. The 'r' bits can refer to the number of bits that can be retired at each iteration. For different radix, the number of bits changes. For example, for $2^r$ (i.e., 2 to the power r) as the equation, in the case of radix 4, it corresponds to $2^2$ (i.e., 2 to the power 2), and so r is equal to 2. By way of another example, in the case of radix 8, it corresponds to $2^3$ (i.e., 2 to the power 3), so r is equal to 3. By way of yet another example, in the case of radix 16, it corresponds to $2^4$ (i.e., 2 to the power 4), and so r is equal to 4. At 670, a determination can be made whether a maximum or threshold iteration count has been reached and/or a type II early out exists. If YES, the flow can return to 652, where another estimate (i.e., Qbit) can be selected from the sparse RAM (e.g., 405 of FIG. 4), and additional iterations can be performed. Otherwise, if NO, the flow can proceed to FIG. 6C through circle 'II.'

Meanwhile, the flow can proceed to 672, where a determination can be made whether the current operation is a floating point operation. If YES, the flow can proceed to 674, where a new exponent can be calculated. Otherwise, if NO, the flow can proceed directly to 676, where a CLZ difference can be determined. At 678, another determination can be made whether the exponent is tiny. Tininess only occurs for and is relevant to floating point operations. If the exponent is not within a certain predefined range, for example, then it is not valid. In other words, if the exponent of a normal operation is less than a "Min Normal" value, then the exponent has a tiny result. The "Min Normal" value can be different depending on the size of the operation. For example, a 64 bit operation can have a different "Min Normal" value than a 32 bit operation. Tininess thresholds can be defined by standards setting organizations such as the Institute of Electrical and Electronics Engineers (IEEE). Referring back to the flow diagram, if YES, meaning the exponent is tiny, then the flow can proceed to 680, where the exponent can be adjusted and/or saved. Otherwise, if NO, the flow can proceed to 682 where the exponent, or alternatively a default solution, can be output. The flow can then proceed to FIG. 6C through circle 'III.'

As shown in FIG. 6C, the flow through circle 'II' can proceed to 684, where a quotient can be selected based on a sign of a partial remainder value (e.g., 382 of FIG. 3). At 686, a determination can be made whether the current operation is a floating point operation. If YES, the flow can proceed to 688 where the quotient can be rounded, for example, by the rounding logic section 505 (of FIG. 5). Otherwise, if NO, the flow can proceed to 690, where another determination can be made whether a special case or exception exists. If YES, the flow can proceed to 692, where a default solution can be provided. Otherwise, if NO, then the flow can proceed to 693, where another determination can be made whether the exponent is tiny (in the case of a floating point operation) or whether the current operation is an integer operation. If YES, the flow can proceed to 694 where the quotient can be shift adjusted. Otherwise, if NO, the flow can proceed to 696, where another determination can be made whether the current operation is an integer operation. The flow from circle 'III' can also meet at 696. If YES, the flow can proceed to 697, where either the post-shifted quotient or a default solution can be output by the shared hardware logic unit (e.g., 105 of FIG. 1). Otherwise, if NO, the flow can proceed to 698 where the sign, the exponent, and the normalized quotient, or a default solution, can be output by the shared hardware logic unit (e.g., 105 of FIG. 1).

It will be understood that while the steps and elements of FIGS. 6A, 6B, and 6C are illustrated and described in a particular order, such steps and/or elements can be arranged in a different order, and may include intervening steps, without departing from embodiments of the inventive concept disclosed herein.

In accordance with embodiments of the inventive concept disclosed herein, die area can be conserved and latency of operations improved. For example, for 64-bit value operations, the latency can be improved by 14 or thereabout. For 32-bit value operations, the latency can be improved by 6 cycles or thereabout. Because many of the hardware components and data paths within the shared hardware integer/floating point divider and square root logic unit 105 are shared among integer division operations, floating point division operations, and square root operations, die area can be reduced.

Figure 7:
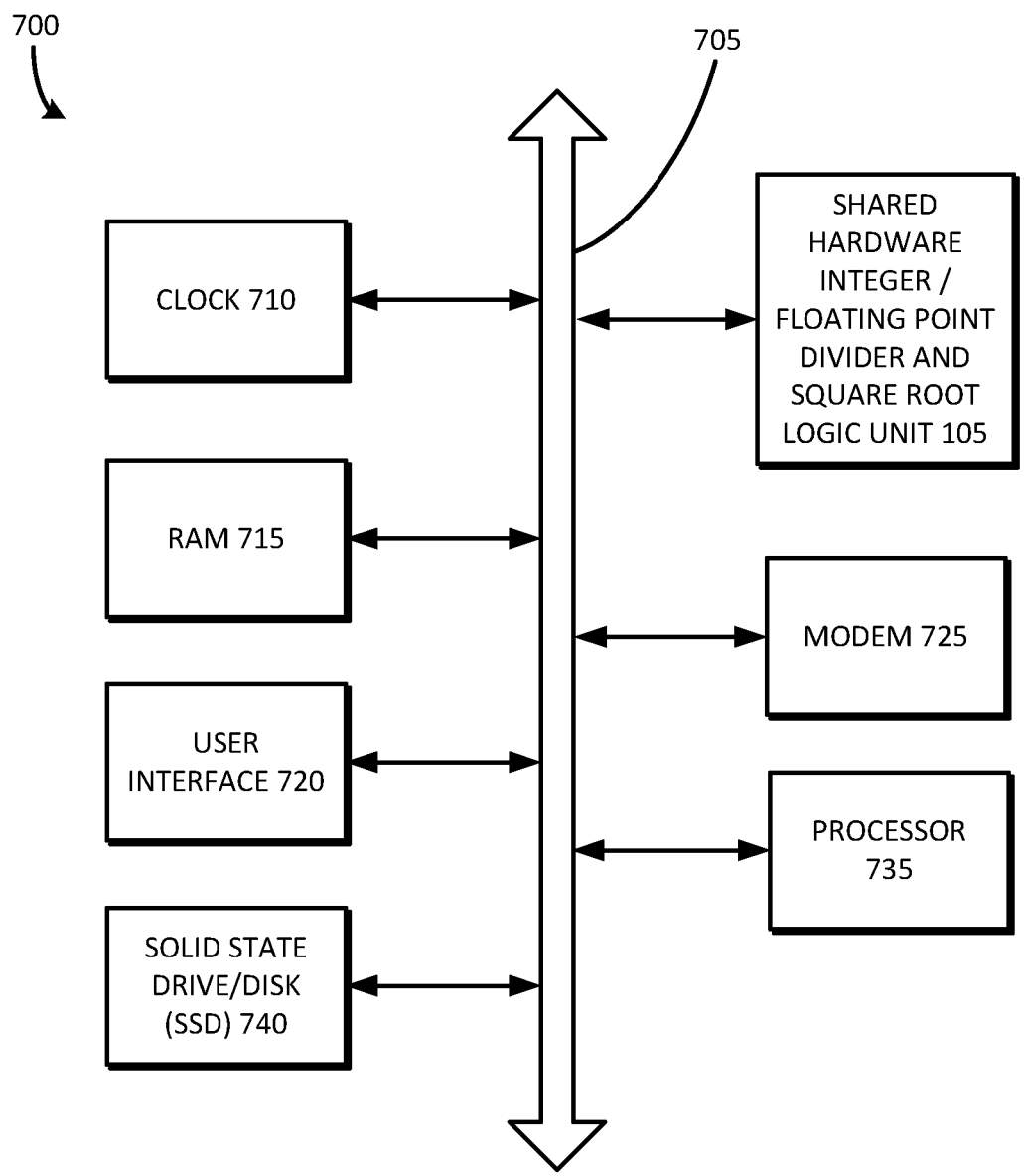
FIG. 7 is a block diagram of a computing system including the shared hardware integer/floating point divider and square root logic unit of FIG. 1.

FIG. 7 is a block diagram of a computing system 700 including the shared hardware integer/floating point divider and square root logic unit 105 of FIG. 1. The computing system 700 can include a clock 710, a random access memory (RAM) 715, a user interface 720, a modem 725 such as a baseband chipset, a solid state drive/disk (SSD) 740, and/or a processor 735, any or all of which may be electrically coupled to a system bus 705. The computing system 700 can include the shared hardware integer/floating point divider and square root logic unit 105 of FIG. 1, which may also be electrically coupled to the system bus 705. The shared hardware logic unit 105 can include or otherwise interface with the clock 710, the random access memory (RAM) 715, the user interface 720, the modem 725, the solid state drive/disk (SSD) 740, and/or the processor 735.

Embodiments of the inventive concept can include a computer-implemented method for processing floating point division, integer division, and square root operations using a shared hardware logic unit. The method can include receiving, by the shared hardware logic unit, a first divisor source input and a first dividend source input. The method can include performing, by the shared hardware logic unit, a floating point divide operation using the first divisor source input and the first dividend source input. The method can include outputting, by the shared hardware logic unit, a quotient result of the floating point divide operation. The method can include receiving, by the shared hardware logic unit, a second divisor source input and a second dividend source input. The method can include performing, by the shared hardware logic unit, an integer divide operation using the second divisor source input and the second dividend source input. The method can include outputting, by the shared hardware logic unit, a quotient result of the integer divide operation.

In some embodiments, the method can include performing, by the shared hardware logic unit, a square root operation using at least one of the first divisor source input, the first dividend source input, the second divisor source input, or the second dividend source input. The method can include sharing, among the floating point divide operation, the integer divide operation, and the square root operation, a same sparse random access memory (sparse RAM) table of the shared hardware logic unit in place of a full partial remainder divisor (PD) table.

In some embodiments, the method can include using a consistent radix for all of the floating point divide operation, the integer divide operation, and the square root operation.

In some embodiments, the method can include initializing an on-the-fly (OTF) state machine, determining an iteration count for at least one of the floating point division operation or the integer division operation, for a particular iteration of at least one of the floating point division operation or the integer division operation, selecting a Qbit estimate from the sparse RAM, receiving, by the OTF state machine, the Qbit estimate, and for the particular iteration, selecting a multiple based on the Qbit estimate.

In some embodiments, the method can include summing, by an adder of the shared hardware logic unit, at least a normalized divisor and a normalized dividend for at least one of the floating point division operation or the integer division operation. The method can include appending, by the OTF state machine, the Qbit estimate to each of a quotient vector (QV) and a quotient vector minus one (QVM) vector for at least one of the floating point division operation or the integer division operation. The method can include, in parallel to the summing and appending, determining an exponent of at least one of the quotient result of the floating point divide operation or the quotient result of the integer divide operation.

In some embodiments, the method can include normalizing, by a count leading zero (CLZ) shift logic section of the shared hardware logic unit, the first divisor source input and the first dividend source input used in the floating point divide operation. The method can include normalizing, by the CLZ shift logic section of the shared hardware logic unit, the second divisor source input and the second dividend source input used in the integer divide operation.

In some embodiments, the method can include detecting, by a first exceptions and special cases handler of the shared hardware logic unit, a first type of early out condition associated with at least one of the first divisor source input or the second divisor source input. The method can include detecting, by a second exceptions and special cases handler of the shared hardware logic unit, a first type of early out condition associated with at least one of the first dividend source input or the second dividend source input.

In some embodiments, the method can include saving, by the first exceptions and special cases handler of the shared hardware logic unit, the first type of early out condition associated with at least one of the first divisor source input or the second divisor source input. The method can include saving, by the second exceptions and special cases handler of the shared hardware logic unit, the first type of early out condition associated with at least one of the first dividend source input or the second dividend source input. The method can include, responsive to the first type of early out condition detected by at least one of the first exceptions and special cases handler or the second exceptions and special cases handler, outputting a default solution.

In some embodiments, the method can include detecting, by the first exceptions and special cases handler of the shared hardware logic unit, a second type of early out condition associated with at least one of the first divisor source input or the second divisor source input. The method can include detecting, by the second exceptions and special cases handler of the shared hardware logic unit, a second type of early out condition associated with at least one of the first dividend source input or the second dividend source input.

In some embodiments, the method can include saving, by the first exceptions and special cases handler of the shared hardware logic unit, the second type of early out condition associated with at least one of the first divisor source input or the second divisor source input. The method can include saving, by the second exceptions and special cases handler of the shared hardware logic unit, the second type of early out condition associated with at least one of the first dividend source input or the second dividend source input. The method can include responsive to the second type of early out condition detected by at least one of the first exceptions and special cases handler or the second exceptions and special cases handler, outputting a default solution.

Embodiments of the inventive concept can include a shared hardware logic unit. The shared hardware logic unit can include a plurality of shared logic sections configured to perform a floating point divide operation and an integer divide operation. The shared hardware logic unit can include a first stage logic section from among the plurality of shared logic sections configured to receive a first divisor source input and a first dividend source input associated with the floating point divide operation, and to receive a second divisor source input and a second dividend source input associated with the integer divide operation. The shared hardware logic unit can include a last stage logic section from among the plurality of shared logic sections configured to output a quotient result of the floating point divide operation and a quotient result of the integer divide operation.

The plurality of shared logic sections can be configured to perform the floating point divide operation using the first divisor source input and the first dividend source input. The plurality of shared logic sections can be configured to perform the integer divide operation using the second divisor source input and the second dividend source input.

The plurality of shared logic sections can be configured to perform a square root operation using a consistent radix as used in the floating point divide operation and the integer divide operation. The shared hardware logic unit can include a shared sparse random access memory (sparse RAM) table that is used in place of a full partial remainder divisor (PD) table, and that is shared among the floating point divide operation, the integer divide operation, and the square root operation.

In some embodiments, the shared hardware logic unit can include a shared on-the-fly (OTF) state machine that is shared among the floating point divide operation, the integer divide operation, and the square root operation. The shared hardware logic unit can include a shared adder that is shared among the floating point divide operation, the integer divide operation, and the square root operation. The shared hardware logic unit can include a shared count leading zero (CLZ) shift logic section that is shared among the floating point divide operation, the integer divide operation, and the square root operation.

In some embodiments, the shared hardware logic unit can include a first exceptions and special cases handler configured to detect a first type of early out condition associated with at least one of the first divisor source input or the second divisor source input, and a second exceptions and special cases handler configured to detect a first type of early out condition associated with at least one of the first dividend source input or the second dividend source input. The first exceptions and special cases handler can be configured to save the first type of early out condition associated with at least one of the first divisor source input or the second divisor source input. The last stage logic section can be configured to output a first default solution based on the first type of early out condition associated with at least one of the first divisor source input or the second divisor source input.

In some embodiments, the second exceptions and special cases handler can be configured to save the first type of early out condition associated with at least one of the first dividend source input or the second dividend source input. The last stage logic section can be configured to output a second default solution based on the first type of early out condition associated with at least one of the first dividend source input or the second dividend source input.

In some embodiments, the first exceptions and special cases handler can be configured to detect a second type of early out condition associated with at least one of the first divisor source input or the second divisor source input. The second exceptions and special cases handler can be configured to detect a second type of early out condition associated with at least one of the first dividend source input or the second dividend source input. The first exceptions and special cases handler can be configured to save the second type of early out condition associated with at least one of the first divisor source input or the second divisor source input. The last stage logic section can be configured to output a third default solution based on the second type of early out condition associated with at least one of the first divisor source input or the second divisor source input. The second exceptions and special cases handler can be configured to save the second type of early out condition associated with at least one of the first dividend source input or the second dividend source input. The last stage logic section can be configured to output a fourth default solution based on the second type of early out condition associated with at least one of the first dividend source input or the second dividend source input.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A computer-implemented method for processing floating point division, integer division, and square root operations using a shared hardware logic unit, the method comprising:
   receiving, by the shared hardware logic unit, a first divisor source input and a first dividend source input;
   performing, by the shared hardware logic unit, a floating point divide operation using the first divisor source input and the first dividend source input;
   outputting, by the shared hardware logic unit, a quotient result of the floating point divide operation;
   receiving, by the shared hardware logic unit, a second divisor source input and a second dividend source input;
   performing, by the shared hardware logic unit, an integer divide operation using the second divisor source input and the second dividend source input; and
   outputting, by the shared hardware logic unit, a quotient result of the integer divide operation;
   detecting, by a first exceptions and special cases handler of the shared hardware logic unit, a first type I of early out condition associated with at least one of the first divisor source input or the second divisor source input;
   detecting, by a second exceptions and special cases handler of the shared hardware logic unit, a second type I of early out condition associated with at least one of the first dividend source input or the second dividend source input;

saving, to a first flip-flop, by the first exceptions and special cases handler of the shared hardware logic unit, the first type I of early out condition associated with at least one of the first divisor source input or the second divisor source input;

saving, to a second-flip flop, by the second exceptions and special cases handler of the shared hardware logic unit, the second type I of early out condition associated with at least one of the first dividend source input or the second dividend source input; and responsive to at least one of the first type I of early out condition or the second type I of early out condition detected by at least one of the first exceptions and special cases handler or the second exceptions and special cases handler, outputting a default solution.

2. The computer-implemented method of claim 1, further comprising:

performing, by the shared hardware logic unit, a square root operation using at least one of the first divisor source input, the first dividend source input, the second divisor source input, or the second dividend source input.

3. The computer-implemented method of claim 2, further comprising:

sharing, among the floating point divide operation, the integer divide operation, and the square root operation, a same sparse random access memory (sparse RAM) table of the shared hardware logic unit in place of a full partial remainder divisor (PD) table.

4. The computer-implemented method of claim 3, further comprising:

using a consistent radix for all of the floating point divide operation, the integer divide operation, and the square root operation.

5. The computer-implemented method of claim 3, further comprising:

initializing an on-the-fly (OTF) state machine;

determining an iteration count for at least one of the floating point division operation or the integer division operation;

for a particular iteration of at least one of the floating point division operation or the integer division operation, selecting a Qbit estimate from the sparse RAM;

receiving, by the OTF state machine, the Qbit estimate; and for the particular iteration, selecting a multiple based on the Qbit estimate.

6. The computer-implemented method of claim 5, further comprising:

summing, by an adder of the shared hardware logic unit, at least a normalized divisor and a normalized dividend for at least one of the floating point division operation or the integer division operation;

appending, by the OTF state machine, the Qbit estimate to each of a quotient vector (QV) and a quotient vector minus one (QVM) vector for at least one of the floating point division operation or the integer division operation; and in parallel to the summing and appending, determining an exponent of at least one of the quotient result of the floating point division operation or the quotient result of the integer divide operation.

7. The computer-implemented method of claim 1, further comprising:

normalizing, by a count leading zero (CLZ) shift logic section of the shared hardware logic unit, the first divisor source input and the first dividend source input used in the floating point divide operation; and normalizing, by the CLZ shift logic section of the shared hardware logic unit, the second divisor source input and the second dividend source input used in the integer divide operation.

8. The computer-implemented method of claim 1, further comprising:

detecting, by the first exceptions and special cases handler of the shared hardware logic unit, a first type II of early out condition associated with at least one of the first divisor source input or the second divisor source input; and detecting, by the second exceptions and special cases handler of the shared hardware logic unit, a second type II of early out condition associated with at least one of the first dividend source input or the second dividend source input.

9. The computer-implemented method of claim 8, further comprising:

saving, by the first exceptions and special cases handler of the shared hardware logic unit, the first type II of early out condition associated with at least one of the first divisor source input or the second divisor source input;

saving, by the second exceptions and special cases handler of the shared hardware logic unit, the second type II of early out condition associated with at least one of the first dividend source input or the second dividend source input; and responsive to at least one of the first type II of early out condition or the second type II of early out condition detected by at least one of the first exceptions and special cases handler or the second exceptions and special cases handler, outputting a default solution.

10. A shared hardware logic unit, comprising:

a plurality of shared logic sections configured to perform a floating point divide operation and an integer divide operation;

a first stage logic section from among the plurality of shared logic sections configured to receive a first divisor source input and a first dividend source input associated with the floating point divide operation, and to receive a second divisor source input and a second dividend source input associated with the integer divide operation; and a last stage logic section from among the plurality of shared logic sections configured to output a quotient result of the floating point divide operation and a quotient result of the integer divide operation.

11. The shared hardware logic unit of claim 10, wherein:

the plurality of shared logic sections are configured to perform the floating point divide operation using the first divisor source input and the first dividend source input; and the plurality of shared logic sections are configured to perform the integer divide operation using the second divisor source input and the second dividend source input.

12. The shared hardware logic unit of claim 11, wherein:

the plurality of shared logic sections are configured to perform a square root operation using a consistent radix as used in the floating point divide operation and the integer divide operation.

13. The shared hardware logic unit of claim 12, further comprising:

a shared sparse random access memory (sparse RAM) table that is used in place of a full partial remainder divisor (PD) table, and that is shared among the floating point divide operation, the integer divide operation, and the square root operation.

14. The shared hardware logic unit of claim 12, further comprising:
a shared on-the-fly (OTF) state machine that is shared among the floating point divide operation, the integer divide operation, and the square root operation.

15. The shared hardware logic unit of claim 12, further comprising:
a shared adder that is shared among the floating point divide operation, the integer divide operation, and the square root operation.

16. The shared hardware logic unit of claim 12, further comprising:
a shared count leading zero (CLZ) shift logic section that is shared among the floating point divide operation, the integer divide operation, and the square root operation.

17. The shared hardware logic unit of claim 12, further comprising:
a first exceptions and special cases handler configured to detect a first type I of early out condition associated with at least one of the first divisor source input or the second divisor source input; and
a second exceptions and special cases handler configured to detect a second type I of early out condition associated with at least one of the first dividend source input or the second dividend source input,
wherein:
the first exceptions and special cases handler is configured to save the first type I of early out condition associated with at least one of the first divisor source input or the second divisor source input;
the last stage logic section is configured to output a first default solution based on the first type I of early out condition associated with at least one of the first divisor source input or the second divisor source input;
the second exceptions and special cases handler is configured to save the second type I of early out condition associated with at least one of the first dividend source input or the second dividend source input; and
the last stage logic section is configured to output a second default solution based on the second type I of early out condition associated with at least one of the first dividend source input or the second dividend source input.

18. The shared hardware logic unit of claim 17, wherein:
the first exceptions and special cases handler is configured to detect a first type II of early out condition associated with at least one of the first divisor source input or the second divisor source input; and
the second exceptions and special cases handler is configured to detect a second type II of early out condition associated with at least one of the first dividend source input or the second dividend source input;
the first exceptions and special cases handler is configured to save the first type II of early out condition associated with at least one of the first divisor source input or the second divisor source input;
the last stage logic section is configured to output a third default solution based on the second first type II of early out condition associated with at least one of the first divisor source input or the second divisor source input;
the second exceptions and special cases handler is configured to save the second type II of early out condition associated with at least one of the first dividend source input or the second dividend source input; and
the last stage logic section is configured to output a fourth default solution based on the type II of early out condition associated with at least one of the first dividend source input or the second dividend source input.

* * * * *